United States Patent
Schleifer (12)

(10) Patent No.: US 6,329,210 B1
(45) Date of Patent: *Dec. 11, 2001

(54) METHOD AND APPARATUS FOR HIGH VOLUME POLYMER SYNTHESIS

(75) Inventor: Arthur Schleifer, Portola Valley, CA (US)

(73) Assignee: Agilent Technologies, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/429,055

(22) Filed: Oct. 29, 1999

(51) Int. Cl.[7] .................. G01N 33/543; A61K 38/00; C07H 21/00
(52) U.S. Cl. .................. 436/518; 530/333; 530/334; 536/231; 536/25.3; 422/129; 422/131; 422/134; 435/283.1; 435/286.5; 435/288.4; 435/292.1; 435/DIG. 1; 435/DIG. 44; 435/DIG. 43; 435/DIG. 46; 435/DIG. 49
(58) Field of Search .................. 436/518, 501; 530/333, 334; 536/25.3, 23.1; 525/54.11; 422/116, 129, 131; 435/DIG. 1, DIG. 46, DIG. 49, DIG. 43, DIG. 44, 283.1, 286.5, 288.4, 292.1

(56) References Cited

U.S. PATENT DOCUMENTS

| | | | | |
|---|---|---|---|---|
| 4,517,338 | * | 5/1985 | Urdea et al. | 435/287 |
| 5,143,854 | * | 9/1992 | Pirrung et al. | 435/518 |
| 5,472,672 | * | 12/1995 | Brennan et al. | 422/110 |
| 5,658,802 | | 8/1997 | Hayes et al. | 436/518 |
| 5,814,700 | | 9/1998 | Brennan | 515/54.11 |

* cited by examiner

*Primary Examiner*—Padmashri Ponnaluri

(57) ABSTRACT

A scalable synthesis apparatus capable of rapid and efficient oligo synthesis. The apparatus includes a combination of dispensing elements, synthesis elements, and waste removal elements. More specifically, the synthesis elements are, in the preferred embodiment, a series of well-like synthesis locations on a continuous strip, where the strip is moving serially from one dispensing location to the next, and waste from each step is evacuated a vacuum egress element, until an entire oligo has been synthesized. Serial oligo synthesis increases the per hour productivity dramatically over batch synthesis apparatus currently used. The number of dispensing locations can be increased or decreased so that oligos of longer or shorter lengths may be synthesized. Moreover, a tremendous reduction of wasted reagents and oligo surplusage by providing serial synthesis.

7 Claims, 5 Drawing Sheets

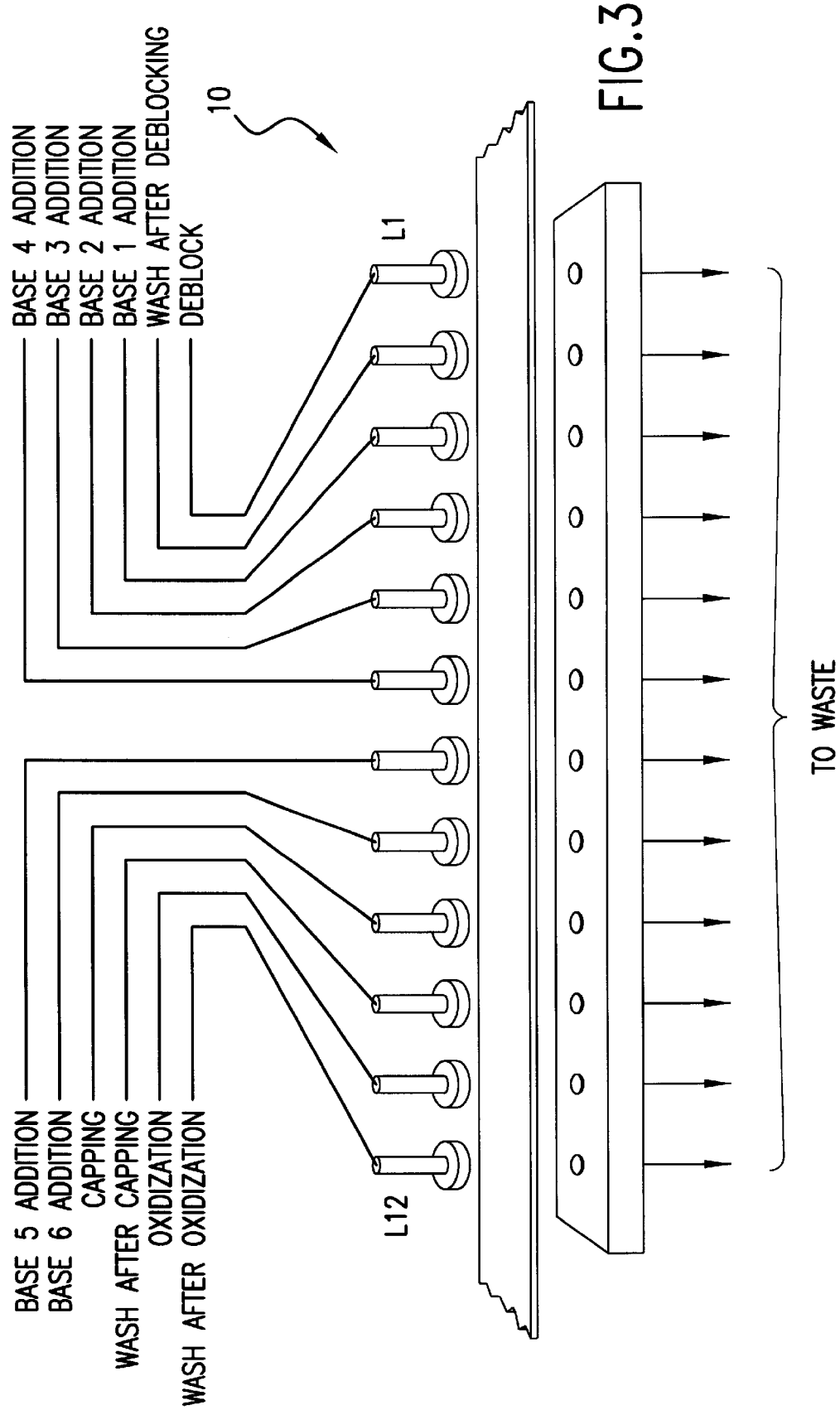

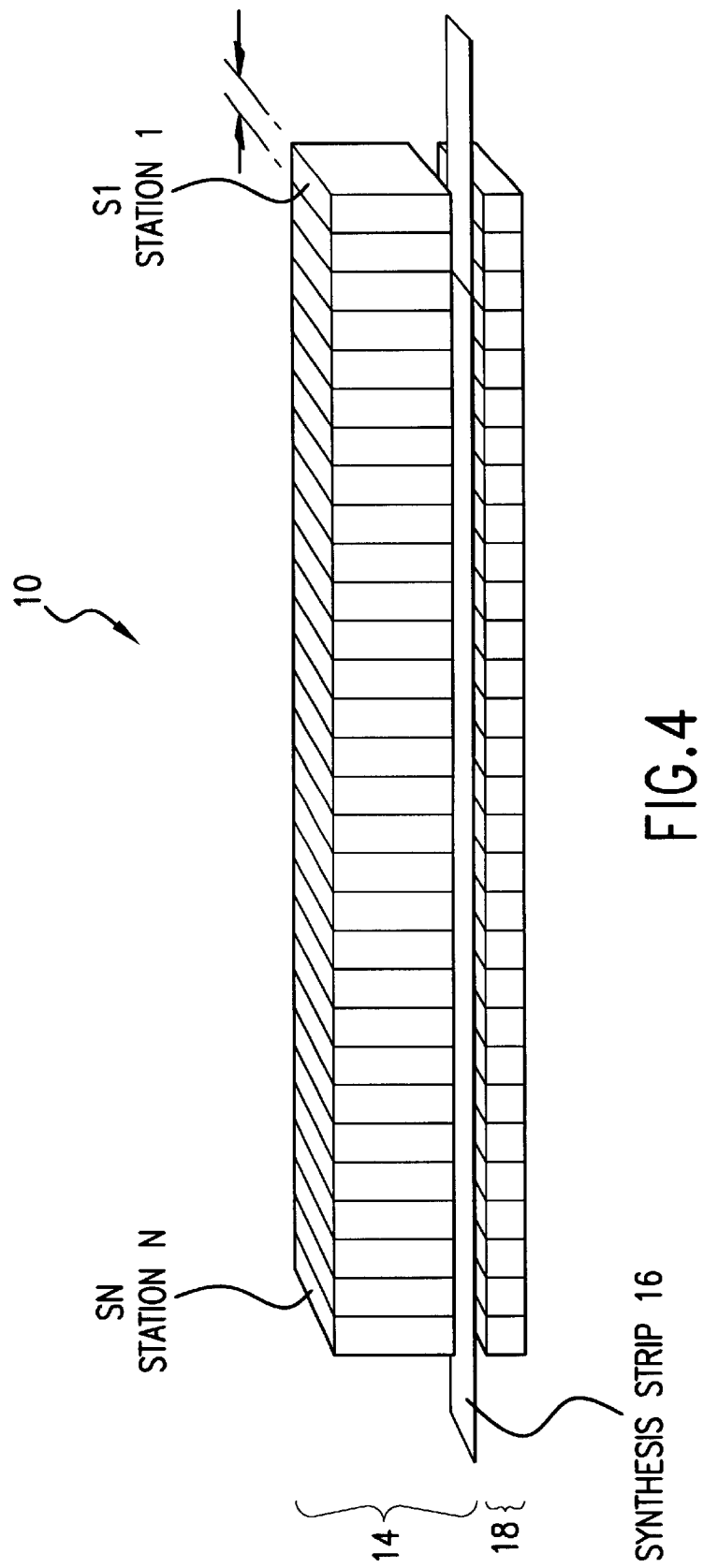

METHOD AND APPARATUS FOR HIGH VOLUME POLYMER SYNTHESIS

BACKGROUND OF THE INVENTION

1. Field of Use

The invention is directed towards the automated synthesis of polymers. More specifically, the invention relates to an apparatus for serial, continuous polymer synthesis, capable of rapid and low cost production of a large number of oligonucleotides.

2. Field of Use

Articles and publications set forth in this patent disclosure are presented for the information contained therein; none of the information is admitted to be statutory prior art and we reserve the right to establish prior inventorship with respect to any such information.

Oligonucleotides are used extensively in modem biotechnology. Applications for oligos include investigations relating to gene expression, polymorphism, drug discovery, and diagnostics, to name a few.

Arrays require large number of oligos, on the average of 10,000 per array. Oligo synthesis is vitally important for investigations using arrays. Oligos may be synthesized in situ, or "grown" where they are subsequently to be use, or oligos synthesized offline, deposited and attached to an array substrate. Such offline synthesis is commonly referred to as the synthesis of "whole" oligos. While automated DNA synthesizers exist, the time required to produce 10,000 oligos for an array is hundreds of hours. A batch type process and apparatus (see, for example, U.S. Pat. No. 5,814,700) can produce 8 dozen 25 mer oligo about every 2.5 hours. Shorter or longer lengths of oligos may be produced, but the batch process does not facilitate dramatic compression of synthesis times. Moreover, automatic synthesizers in use are not amenable to producing small amounts of oligos. Automatic synthesizers typically produce on the order of 200 Pico moles of an oligo, which is enough oligo for more than 400,000 arrays! Few applications require that many identical arrays. Often the actual amount required may be 40 nanomoles or less. The minimum quantities produced by automatic synthesizers result in much wasted oligos and all materials, included reagents and solvents, used in oligo synthesis.

Synthesizers such as the ABI, use columns as the support for the synthesis. Typical machines can support one to four columns at a time. Some others can have up to twenty-four in parallel. These systems are a closed flow-through operation All reagents are tied together to a common manifold. Both time and reagent are spent to flush our prior reagents switch to another reagent, and flow enough material through the column. Batch operation machines, such as described by Brennan (U.S. Pat. No. 5,814,700) use an array of wells, such as a 96 well titer plate. A solid support is inserted into each well and reagents are dropped into each well, and a differential pressure is applied from the top to the exit port at the bottom of the wells. The solution flows through the solid support to waste. Each line is dedicated to a single reagent, thus ensuring that the required amount will be delivered to the wells. A disadvantage is the time required dispensing reagent to each of the wells. Although reagent can be dispensed in parallel by replicating dispensers, the system then bears added complexities. Moreover, in apparatus in which reagents are dispensed serially, dwell times are different for the wells at the beginning of the titer plate versus wells at the end. Exposure times are not identical across rows. All synthesis chemistry is not equally tolerant of such differences, and the synthesis may be adversely affected.

Further, in batch mode, addition of each reagent must be complete before removal may be commenced.

As concerns scaling up the oligo synthesis process, merely adding more wells to a batch process, while increasing throughput, does not increase productivity. The more wells, the more time required to add reagents, or, alternatively, the more added reagent dispensing capability increases the complexity of the system.

At the most practical level, adding more reagent addition nozzles is hindered by close array spacing in denser arrays. Although approaches, such as adding a Y actuator, could be added to denser arrays, dispensing and actuation time become increasingly problematic.

What is needed is a scalable oligo synthesis apparatus capable of quick and cost effective oligo synthesis suitable for use in applications such as arrays.

SUMMARY OF THE INVENTION

The invention provides a scalable synthesis apparatus capable of quick and cost effective oligo synthesis , such oligos suitable for use in applications such as arrays.

The invention provides a polymer synthesis apparatus for building a polymer chain by sequentially adding polymer units. The polymer synthesis apparatus is a serial-based operation machine. The apparatus provides several stations. Each station contains a series of stopping locations, each stopping capable of performing a step in the synthesis protocol. A continuous strip moves through the apparatus, operable to present the stopping locations with solid support sites. Each site of the solid support is either on, encapsulated in, or is otherwise a location on a continuous strip of material, a strip containing sites for synthesis operations, that is moving continuously through the synthesizer. Each functional synthesis site on the strip has a vacuum egression operable to provide an exit for reagents and gases introduced from the apparatus and through an ingress into the sealed site. As the solid support strip moves to the next stop position, the locations for the synthesis on the strip are directly under the locations for a particular operation. Stations as well as stopping locations may be added or removed to adapt the apparatus for the particular synthesis application, which may be a longer or shorter oligo. Briefly, a particular synthesis may require twelve stopping locations. As a strip is passing through the station, the first location for synthesis stops under a location for deblocking. The station actuates the deblocking by making a seal on the strip around the site for synthesis. The deblocking solution is allowed to flow across the synthesis membrane removing the DMT or other protecting group on the membrane. The flow of the deblocking solution is stopped and seal is removed from the strip. Then, the entire strip moves to the next stopping position. The site that was just under the deblocking station is now under the Wash-after-deblocking station and a new site on the strip is now under the deblocking station. A seal is now made for both locations and deblocking occurs in the second synthesis location. In the first synthesis location, an inert gas is passed through the membrane to remove the remaining deblocking reagent from the first location and then is cleaned by passing Acetonitrile (ACN) through the membrane and then inert gas again to dry the membrane. The cleaning step in the second location and the deblocking step in the first location are performed in parallel. When both are finished, the seal is broken again and the strip advances to the next indexed position. The parallel step and indexed progression proceed until the strip has passed through all the stations and synthesis protocols have been completed at each synthesis location on the strip. The steps involved include indexing the synthesis strip to the next location, creating a seal to the synthesis site, and causing the appropriate reagent and/or gases to pass through the membrane. As the first synthesis site on the strip passes the last location on the station, all of the required operations have been performed to add one monomer to the synthesis site. A plurality of synthesis sites, L1 to LN, may be provided in an advanceable manner by moving the continuous strip. Both the synthesis sites L1 to LN and the reagent introduction stations S1 to SN are aligned by movement of the continuous strip. After the step of unsealing, the synthesis sites are advanced by moving the continuous strip until the next reagent introduction station is in alignment whereupon the sealing member of that reagent introduction station is then sealably coupled or engaged to the synthesis site.

To build an oligo of a particular length, a number of stations are placed together so that the continuous synthesis strip moves from one station to the next, adding one monomer at each station, until the full length required is synthesized. Then, after the next indexing of the synthesis strip, the second site has a complete oligo synthesized. After each subsequent indexing of the synthesis strip comes off the final station, the synthesis site can be removed or punched out of the strip and placed into an array of wells for post synthesis processing.

BRIEF DESCRIPTION OF THE DRAWINGS

FIG. 3 is illustrative of a section of the preferred embodiment.

FIG. 4 is illustrative of multiple sections of the preferred embodiment.

DETAILED DESCRIPTION OF THE PREFERRED EMBODIMENT

For convenience and ease of comprehension, similar features or components are numbered consistently throughout the accompanying Figures.

The polymer synthesis apparatus generally designated 10, is a serial-based operation machine. As can be seen by referring to the Figures collectively, and FIG. 2 for a single operation and FIG. 4 for multiple operations in particular, the apparatus 10 provides several stations S1 through SN. Each station, as may be seen by referring to FIG. 3 contains a series of stopping locations, L1 through L12. Each stopping location L is characterized by the performance of a step in the synthesis protocol associated with the oligo to be synthesized. Examples of steps which, if performed according to a protocol and under conditions for synthesis known to those in the art, would result in an oligo are set forth in Table A below.

TABLE A

Figure 1A:
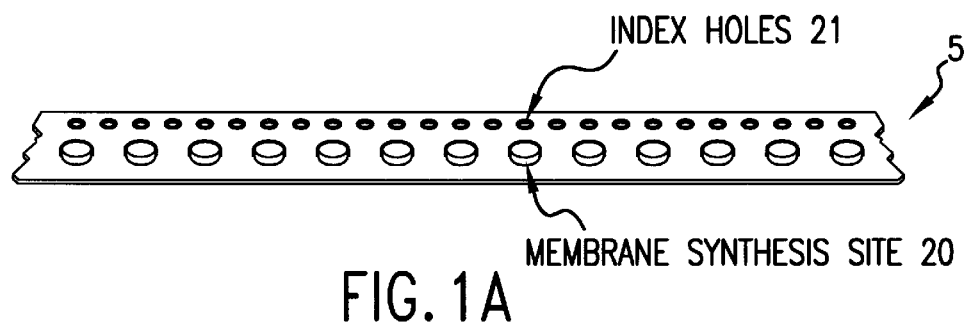
FIG. 1A depicts a continuous strip with the functionalized membrane sites attached or sandwiched between plastic film according to the preferred embodiment.
Figure 1B:
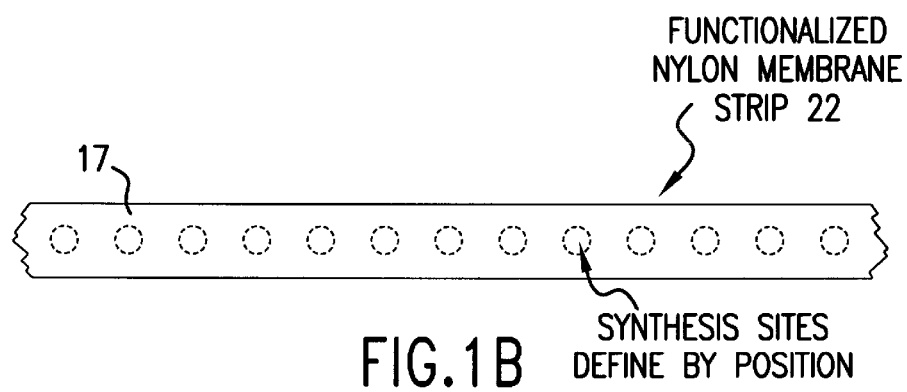
FIG. 1B depicts an alternate embodiment of the continuous strip.
Figure 1C:
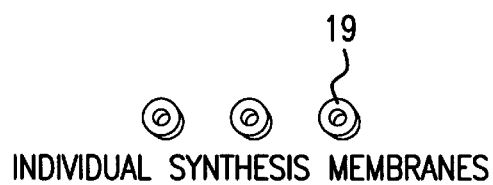
FIG. 1C depicts membranes for insertion into the synthesis sites according to the preferred embodiment.
Figure 2A:
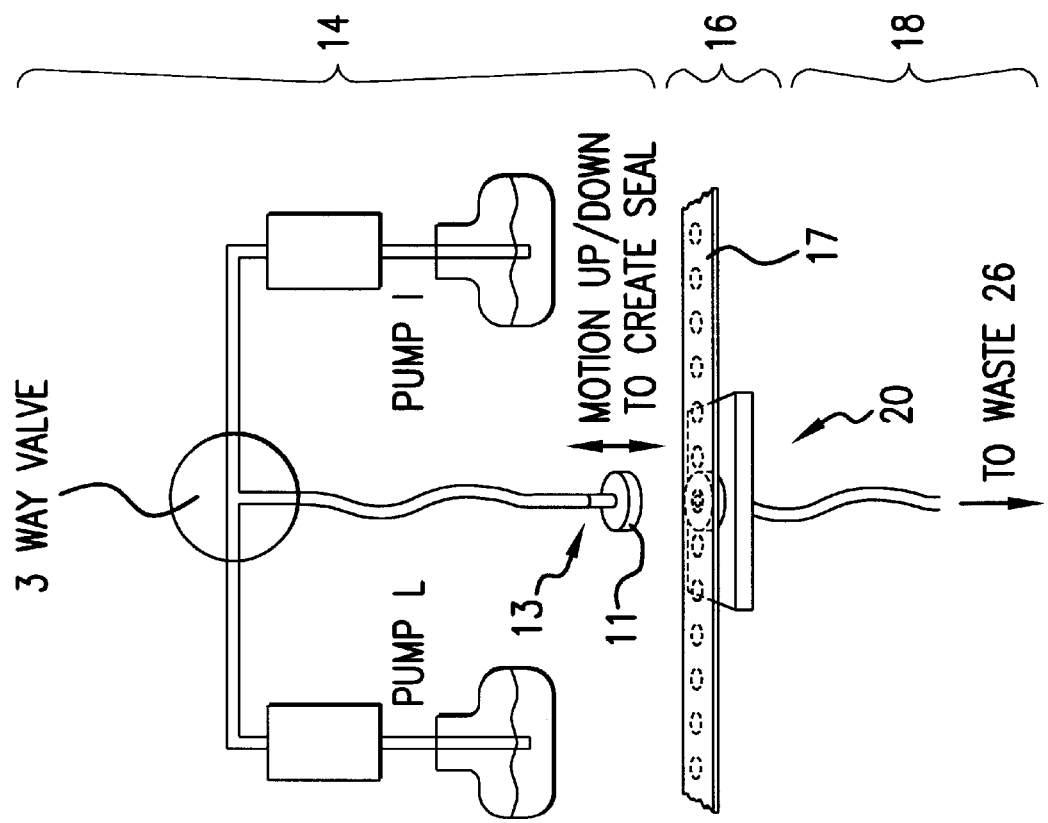
FIG. 2A sketches the ingress, strip with seal, and egress operations associated with a functional site on the strip moving through the apparatus as taught herein.
Figure 2A:
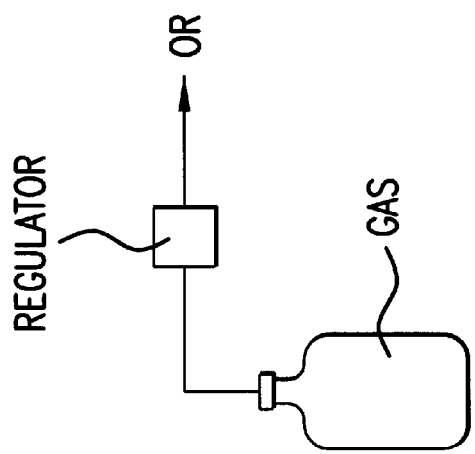
Figure 2B:
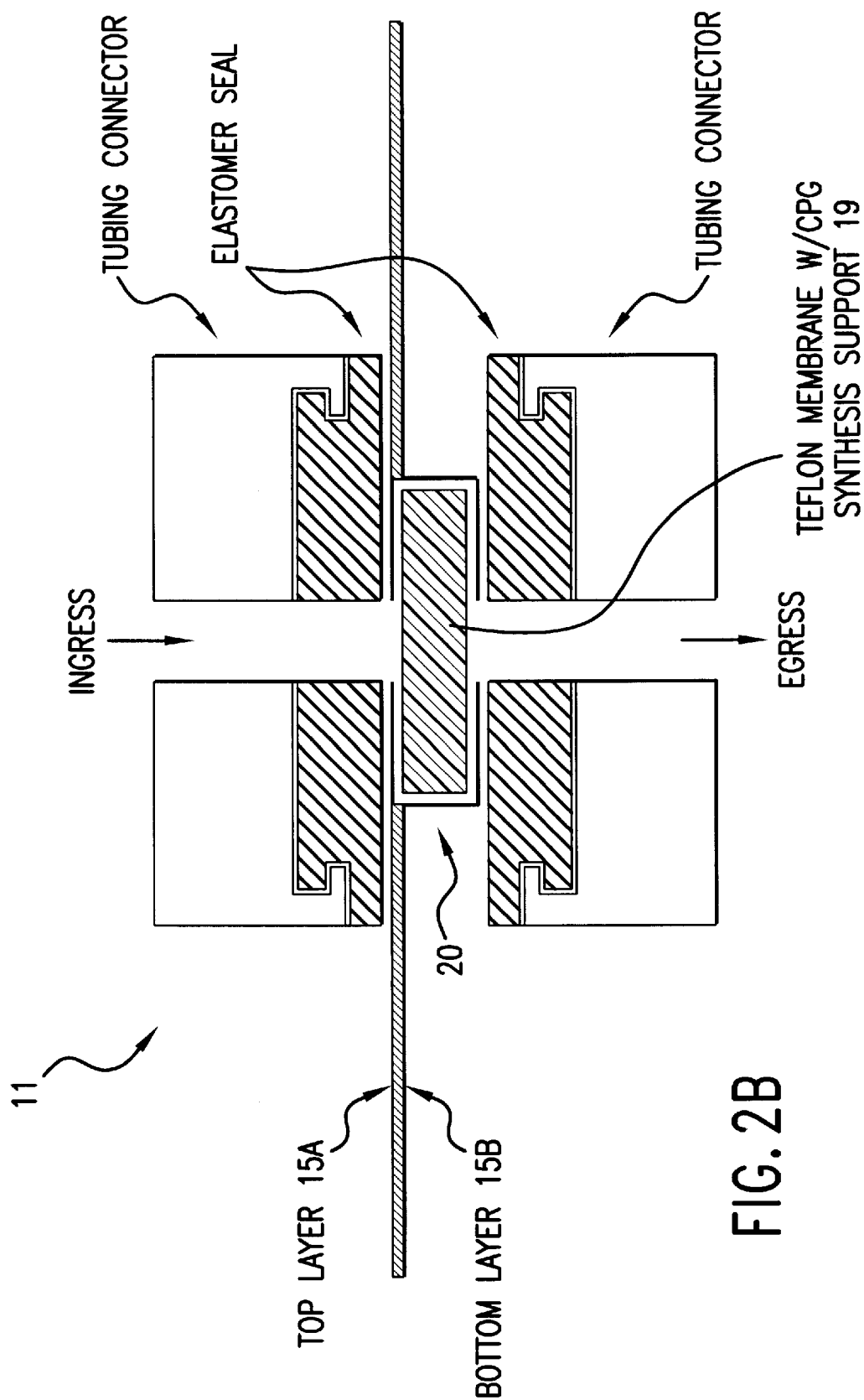
FIG. 2B illustrates a detailed view of the sealed synthesis site, according to the preferred embodiment.

Exemplary Oligo Protocol
Step
 1 Deblocking
 2 wash after deblocking
 3 base addition for the A phosphoreamidite (PA)
 4 base addition for C-PA
 5 base addition for G-PA
 6 base addition for T-PA
 7 base addition for extra PA
 8 base addition for extra PA
 9 capping
 10 wash after capping
 11 oxidation
 12 wash after oxidation The stopping locations L1 through L12 may be considered junctures at which the apparatus dispensing elements 14 in FIG. 2, are brought into coupleable or sealable alignment with the apparatus continuous strip element 16 which moves relative to the dispensing elements. The continuous strip element 16 and the advancing motion thereof is operable to present the stopping locations with solid support sites. Each site of the solid support is either on, encapsulated in, or is otherwise a location on a continuous strip of material FIG. 1A (for the preferred embodiment, FIG. 1B for an alternate embodiment), that is to say, a strip containing sites for synthesis operations, which strip is advancing relative to the dispensing elements of the apparatus. Each functional synthesis site 20 on the strip 17 has a vacuum egression 26, FIG. 2, operable to provide an exit for reagents and gases introduced from the apparatus and through an ingress 13, FIG. 2A, in to the sealed site 11, FIG. 2B. As the solid support strip moves to the next stop position, the locations for the synthesis on the strip are directly under the locations for a particular operation. Stations as well as stopping locations may be added or removed to adapt the apparatus for the particular synthesis application, which may be a longer or shorter oligo.

The continuous strip FIG. 1A, is, in the preferred embodiment, is a strip of plastic film 15 exhibiting index perforations 21 in a margin and having membrane synthesis sites 20 at predetermined intervals. Upon the strip, a functionalized membrane of TEFLON® material with CPG embedded material 19 is alignably attached to the plastic film 15. Synthesis site positions 23 in the nylon member 22 are an alternate embodiment of the membrane synthesis sites 20 on the plastic strip 15 wherein there are inserted individual synthesis sites include individual synthesis membranes 19. The synthesis membranes are teflon impregnated with CPG (controlled pore glass). The synthesis membrane as used in the preferred embodiment is trademarked as CPG-MEMSTAR® and offered for sale by CPG, Inc.

FIG. 2 illustrates a single operation step as it is performed in the preferred embodiment. The continuous strip 16 and, in particular, the synthesis site 20 are aligned beneath sealing member 11. The sealing member 11 is connected to and provides a conduit and ingress for reagents or gas supplies 13 to the synthesis site on the continuous strip. The sealing member moves in a manner to allow sealing and unsealing of the synthesis site. On the side of the sealing membrane opposite the ingress, there is an egress 26 from the synthesis site, said egress operable to apply a vacuum suction to the base of the synthesis membrane, said vacuum applied for the purpose of removing waste, including spent gas and reagents through the egress.

An oligo synthesis is accomplished by the cumulative effects of stopping at a series of locations, sealably coupling the sealing member 22 with the synthesis site 20, introducing reagent into the sealed synthesis site, evacuating the introduced reagent through the vacuumed egress 26.

Briefly, a particular synthesis may require, for example, twelve stopping locations. As a strip is passing through the station, the first location for synthesis stops under a location for the first operation-deblocking. The station actuates the deblocking by making a seal on the strip around the site for synthesis. The deblocking solution is allowed to flow across the synthesis membrane removing the DMT or other protecting group on the membrane. The flow of the deblocking solution is stopped and seal is removed from the strip. Then, the entire strip moves to the next stopping position. The site that was just under the deblocking station is now under the "wash-after-deblocking" station and a new site on the strip is now under the "deblocking" station. A seal is now made for both locations and deblocking occurs in the second synthesis location. In the first synthesis location, an inert gas is passed through the membrane to remove the remaining deblocking reagent from the first location and then is cleaned by passing Acetonitrile (ACN) through the membrane and then inert gas again to dry the membrane. The cleaning step in the second location and the deblocking step in the first location are performed in parallel. When both are finished, the seal of each site is broken again and the strip advances to the next indexed position. The parallel step and indexed progression proceed until the strip has passed through all the stations and synthesis protocols have been completed at each synthesis location on the strip.

Indexing the synthesis strip to the next location, creating a seal to the synthesis site, and causing the appropriate reagent and/or gases to pass through the membrane. As the first synthesis site on the strip passes the last location on the station, all of the required operations have been performed to add one monomer to the synthesis site. To build an oligo of a particular length, a number of stations are placed together (see FIG. 4) so that the continuous synthesis strip moves from one station to the next, adding one monomer at each station, until the full length required is synthesized. Then, after the next indexing of the synthesis strip, the second site has a complete oligo synthesized. After each subsequent indexing of the synthesis strip comes off the final station, the synthesis site can be punched out of the strip or otherwise removed, and placed into an array of wells for post synthesis processing.

It is to be understood that protocols for oligonucleotide synthesis may be used in the present invention. See, for example, methods outlined in Oligonucleotides and Analogues: A Practical Approach, F. Eckstein, Ed. IRL Press, Oxford University. And See Oligonucleotide Synthesis: A Practical Approach, Gait, Ed. IRL Press. See also U.S. Pat. Nos 4,458,066; 4,500,707; 5,047,524 and 5,814,700.

Finally, it merits re-stating the tremendous advantage presented by the serial (as compared with batch) approach as taught herein. A typical batch approach (such as is used by all automatic synthesizers commercially available) with a dwell time of 5 minutes per cycle, with a 96 well batch, produces the average 25 mer at the rate of forty to fifty per hour. The invention, as set forth in the preferred embodiment, with an index time of 5 seconds, at a rate of 1 minute per base, can produce the same length oligo at the vastly increased rate of seven hundred and twenty per hour.

While the foregoing has been described in terms of the preferred embodiment, these are not to be construed as limitations on the disclosure or claims to follow. Modifications and changes that are within the purview of those skilled in the art are intended to fall within the scope of the following claims.

What is claimed is:

1. A method for synthesizing a plurality of polymers on a surface of a continuous strip, each of said polymers being synthesized at a distinct site on said surface, said method comprising:

a) independently sealing each of a plurality of synthesis sites present on the surface of a continuous strip of material to create a plurality of sealed synthesis sites, each of said synthesis sites comprising a portion of a said surface, said synthesis sites being independently functionalized for reaction with a fluid reagent and further comprising an ingress and an egress, b) independently introducing, at each of said sealed synthesis sites through said ingress, fluid reagents for synthesizing a polymer, each of said fluid reagents comprising one or more reagents for performing a step of said synthesis, c) independently removing unreacted fluid reagents from each of said synthesis sites through said egress, d) independently unsealing said synthesis sites, e) moving said continuous strip to advance each of said synthesis sites sequentially to a plurality of stations for introducing fluid reagents wherein said synthesis sites and said stations become aligned, f) repeating steps a) through e) sufficient to form a polymer at each of said synthesis sites.

2. A method as in claim 1 wherein said egress comprises a membrane impregnated with controlled pore glass and unreacted fluid reagents are removed in step c) by means of said membrane.

3. A method as in claim 1 wherein a sealing member of each of said stations is sealably engaged with a portion of said surface to form each of said sealed synthesis sites.

4. A method as in claim 3 wherein said sealing member is a dispensing element.

5. A method as in claim 1 wherein fluid reagents at at least a portion of said synthesis sites independently comprise a polymer unit, which reacts with and becomes attached to said functionalized synthesis sites.

6. A method as in claim 1 wherein fluid reagents at at least a portion of said synthesis sites independently comprise a reagent selected from the group consisting of wash reagents, deblocking reagents, inert gases and oxidation reagents.

7. A method as in claim 1 wherein said continuous strip comprises index holes.

* * * * *